United States Patent
Pan et al.

(10) Patent No.: US 8,716,944 B2
(45) Date of Patent: May 6, 2014

(54) NON-ISOLATED AC/DC CONVERTER WITH POWER FACTOR CORRECTION

(75) Inventors: Ching-Tsai Pan, Hsinchu (TW); Po-Yen Chen, Hsinchu (TW); Yu-Hsiang Lee, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 190 days.

(21) Appl. No.: 13/409,523

(22) Filed: Mar. 1, 2012

(65) Prior Publication Data
US 2013/0169176 A1 Jul. 4, 2013

(30) Foreign Application Priority Data
Dec. 30, 2011 (TW) .............................. 100149688 A

(51) Int. Cl.
H05B 37/02 (2006.01)
H05B 39/02 (2006.01)
H05B 39/04 (2006.01)
H05B 41/36 (2006.01)
H02M 5/42 (2006.01)

(52) U.S. Cl.
USPC ...................................... 315/200 R; 315/171

(58) Field of Classification Search
USPC ........... 315/200 R, 36, 46, 49, 101, 171, 189, 315/324, 352; 363/89; 323/222
See application file for complete search history.

(56) References Cited

U.S. PATENT DOCUMENTS

| | | | |
|---|---|---|---|
| 7,230,405 B2 * | 6/2007 | Jang et al. | 323/222 |
| 2004/0256998 A1 * | 12/2004 | Yang | 315/171 |
| 2005/0036345 A1 * | 2/2005 | Lin et al. | 363/89 |
| 2011/0309759 A1 * | 12/2011 | Shteynberg et al. | 315/201 |
| 2012/0113692 A1 * | 5/2012 | Telefus et al. | 363/37 |
| 2013/0193879 A1 * | 8/2013 | Sadwick et al. | 315/307 |
| 2013/0250637 A1 * | 9/2013 | Pan et al. | 363/126 |

* cited by examiner

*Primary Examiner* — Alexander H Taningco
*Assistant Examiner* — Dylan White
(74) *Attorney, Agent, or Firm* — Chun-Ming Shih

(57) ABSTRACT

A non-isolated AC/DC converter having power factor correction, comprising an active switch connected to a waveform controller for control, and sequentially showing conduction, cut off, making the alternating current power supply pass through one circuit rectifier for rectifying and forming one positive half sine wave electricity supply, which passes through a voltage step-down circuit to proceed with decreasing the voltage, then passing through a filter/storage circuit for filtering and forming direct current power supply, which is stored on this filter/storage circuit, then releasing the energy and supplying electricity to the electricity end; as a transformer isn't required, the circuit volume can be reduced, lowering costs, raising circuit conversion rates and achieving power factor correction and increasing the lifespan of the transformer, moreover, through the waveform controller controlling the output waveform, the storage circuit utilizes a lower capacity capacitor to avoid using an electrolytic capacitor, thereby increasing the circuits lifespan.

4 Claims, 3 Drawing Sheets

NON-ISOLATED AC/DC CONVERTER WITH POWER FACTOR CORRECTION

BACKGROUND OF THE INVENTION

1. Field of the Invention

The present invention relates to a non-isolated AC/DC converter with power factor correction, in particular, to a single stage circuit architecture without using any transformers, therefore, reducing the circuit volume, lowering costs, raising circuit conversion rates, and thus achieving the goals of power factor correction and increasing the lifespan of the transformer, moreover, through the waveform controller controlling the output waveform, the storage circuit can utilize a lower capacity capacitor to avoid using an electrolytic capacitor, thereby increasing the circuits lifespan.

2. Description of Related Art

Most traditional AC/DC converters require a rectifier circuit which converts the input AC power supply into DC power, and the output end of the rectifier circuit is in parallel with the direct current link output capacitor, and also serves as a circuit filter and for storing energy.

The size of the storage value of the Direct Current link output capacitor and the output ripple voltage becomes inverse, and the storage value of the capacitor also increases. This also means that within the input AC voltage cycle period, the time period that the input AC voltage is lower than the capacitor voltage also increases accordingly.

Because of this, the diode conduction time of the bridge style rectifier decreases and the conduction direct current peak value increases and in addition the waveform of the increased input electric current is distorted. Therefore this low power factor class of equipment and products, besides wasting energy, also increases the unnecessary virtual work for power companies.

From this it can be seen that the above mentioned conventional product has many drawbacks, and is not an ideal design, and urgently needs improvement.

Aimed at the flaws and drawbacks of the abovementioned AC/DC converter, this inventor was eager to improve and innovate, and after years of concentration and painstaking research, has finally successfully developed this kind of non-isolated AC/DC converter having power factor correction.

SUMMARY OF THE INVENTION

One purpose of the present invention is to provide a non-isolated AC/DC converter with power factor correction, which is merely a single stage circuit architecture without using any transformers, thereby reducing circuit volume, lowering costs, raising circuit conversion rates, and achieving the goals of power factor correction and increasing the lifespan.

Another purpose of the present invention is to provide a non-isolated AC/DC converter with power factor correction, which not only increases the conducting time of the rectifier circuit and further reduces conductive current peak value, thereby achieving the purpose of power factor correction, but also applying a low harmonic DC voltage to the load.

An additional purpose of the present invention is to provide a non-isolated AC/DC converter with power factor correction, which outputs waveform regulation through the waveform controller, and the storage circuit can utilize a capacitor with lower capacity to avoid using electrolytic capacitors, thereby increasing the circuit lifespan.

The non-isolated AC/DC converter with power factor correction for achieving the abovementioned purpose, including: an AC power supply, a rectifier circuit, a step-down circuit, a filter/storage circuit and a voltage regulator circuit; wherein the rectifier circuit connects in parallel with the AC power supply, having a rectifier bridge configured by four diodes, the rectifier circuit converts AC power supply into a positive half sine wave power; the step-down circuit connects in parallel with the rectifier circuit, having a first inductor and an active switch, the active switch controlled by a waveform controller to serve as conduction (ON) and cutoff (OFF), therefore as there aren't any transformers, the time period for charging the half-sine wave power to the first inductor is controlled by using the cycle of conduction and cutoff, thereby reducing the charging time and lowering potential, making the half-sine wave power decrease the voltage; the filter/storage circuit connects in series with the step-down circuit, having a first capacitor, a second inductor and a diode, the first capacitor able to filter the half-sine wave power after decreasing the voltage and making the half-sine wave power become a DC power, then the DC power is restored in the first capacitor and the second inductor; the voltage regulator circuit connects in series with the filter/storage circuit and connects in parallel with an end user, having a second capacitor for regulation, When in use, the active switch is controlled by the waveform controller and presents operating mode 1: the active switch is conducted, which allows the AC power supply to be rectified by the rectifier circuit as a half sine wave power, utilizing the first inductor to reduce the charging time, lowering the voltage and storing the energy in the first inductor; at the same time, the first capacitor supplies power to the second inductor and the end user with its previously stored DC power, thus the another inductor proceeding with energy storage and the end user requiring DC power supply.

Then, the active switch is controlled by the waveform controller and presents operating mode 2: the active switch is cut off, which allows the first inductor to pass its previously stored half sine wave power through the first capacitor and to be rectified as DC power and stored in the first capacitor; at the same time, the second inductor supplies power to the end user with its previously stored DC power; likewise, the operating mode 1 and 2 are repeated constantly, and the end user promptly obtains DC power supply converted from the AC power supply.

The invention, as well as its many advantages, may be further understood by the following detailed description and drawings in which:

DETAILED DESCRIPTION OF THE INVENTION

The present invention provides a "non-isolated AC/DC converter with power factor correction", please refer to FIG. 1, which mainly includes: an AC power supply VAC, a rectifier circuit 11, a step-down circuit 12, a filter/storage circuit 13 and a voltage regulator circuit 14, wherein, the rectifier circuit 11 connects in parallel with the AC power supply VAC, having a rectifier bridge configured by four diodes D1, D2, D3 and D4, AC power supply VAC can be rectified by the rectifier circuit 11 into a half-sine wave power.

The step-down circuit 12 connects in parallel with the rectifier circuit 11, having a first inductor L1 and an active switch S, the active switch S is controlled by a waveform controller (not shown in the figure), showing conduction (ON) and cut-off (OFF), therefore as there aren't any transformers, the time for charging the half-sine wave power to the first inductor L1 is controlled by using the cycle of conduction and cutoff, thereby reducing the charging time and reducing potential, and making the half-sine wave power step-down.

The filter/storage circuit 13 connects in series with the step-down circuit 12, having a first capacitor C, a second inductor and a diode D, the first capacitor C able to filter the half-sine wave power after step down and make the half-sine wave power become a DC power, then the DC power is restored in the first capacitor C and the second inductor D.

The voltage regulator circuit 14 s connected in series with the filter/storage circuit 13 and connected in parallel with an end user R, and has a second capacitor C for regulation.

When in use, please refer to FIGS. 2, 3, 4 and 5, the active switch S is controlled by the waveform controller and presents operating mode 1: the active switch S conducts, which allows the AC power supply VAC to be rectified by the rectifier circuit 11 as a half sine wave power, utilizing the first inductor L1 to reduce the charging time, lowering the voltage and storing the energy in the first inductor L1; at the same time, the first capacitor C supplies power to the second inductor L2 and the end user R with its previously stored DC power, thus the second inductor L2 proceeds with energy storage and the end user R obtains a DC power supply.

Then, the active switch S is controlled by the waveform controller and presents operating mode 2: the active switch S is cut off, which allows the first inductor L1 to pass its previously stored half sine wave power through the first capacitor C and to be rectified as DC power and stored in the first capacitor C; at the same time, the second inductor L2 supplies power to the end user R with its previously stored DC power.

Likewise, operating modes 1 and 2 are repeated constantly, the end user promptly obtains DC power supply converted from AC power supply, furthermore only requires a single stage circuit architecture without using any transformers, thereby reducing the circuit volume, lowering costs, raising circuit conversion rates, and thus achieving the goals of power factor correction and increasing the lifespan of the transformer; moreover, through switching the active switch S, which not only increases the conducting time of the rectifier circuit and further reduces conductive current peak value, thereby achieving the purpose of power factor correction, but also applying the low harmonic DC voltage to the load.

Additionally, the waveform controller is a waveform generator, which outputs a waveform to trigger and control the active switch S to present conduction (ON) and cut off (OFF), so, through the waveform controller controlling the output waveform, the storage circuit can utilize a lower capacity capacitor to avoid using an electrolytic capacitor, thereby increasing the circuits lifespan.

According to the following formula, the waveform controller adjusts and controls the conduction cycle d (t) of the output waveform of the active switch S:

$$d(t) = \frac{V_o}{V_o + V_m|\sin \omega \tau|}$$

wherein, Vo is the output voltage,
Vm is the maximum value of the input voltage, and
sin ωτ is the sinusoidal frequency of the mains voltage.
The end user R is an LED bulb.
The AC power supply VAC is supplied by an electric power company.

When comparing the non-isolated AC/DC converter with power factor correction provided from the present invention with the aforementioned conventional techniques, the present invention has the following advantages:

1. Only requires a single stage circuit architecture without using any transformers, therefore, reducing the circuit volume, lowering costs, raising circuit conversion rates, and thus achieving the goals of power factor correction and increasing the lifespan of the transformer 2. Through switching the active switch, which not only increases the conducting time of the rectifier circuit and further reduces conductive current peak value to achieve the purpose of power factor correction, but also obtains an increased load for the low harmonic DC voltage.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

BRIEF DESCRIPTION OF THE DRAWINGS

The invention, as well as its many advantages, may be further understood by the following detailed description and drawings in which.

Figure 1:
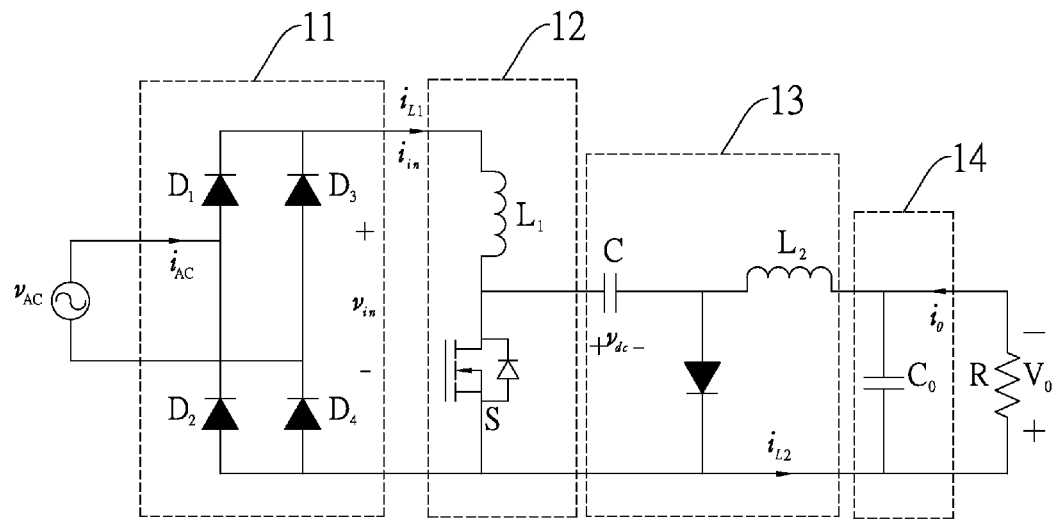
FIG. 1 is a circuit diagram of the invention.
Figure 2:
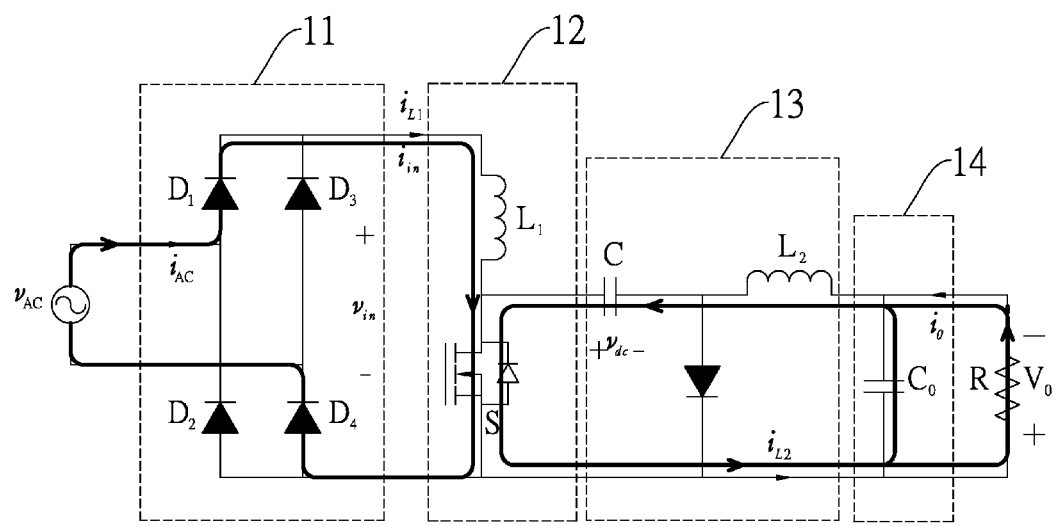
FIGS. 2 and 3 are the circuit schematic diagrams showing the operating mode 1 of the invention.
Figure 3:
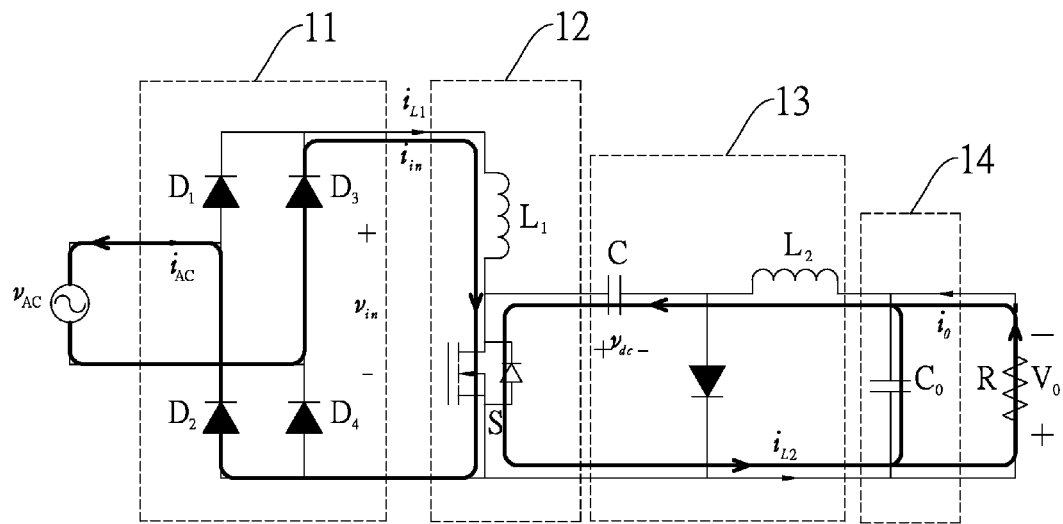
Figure 4:
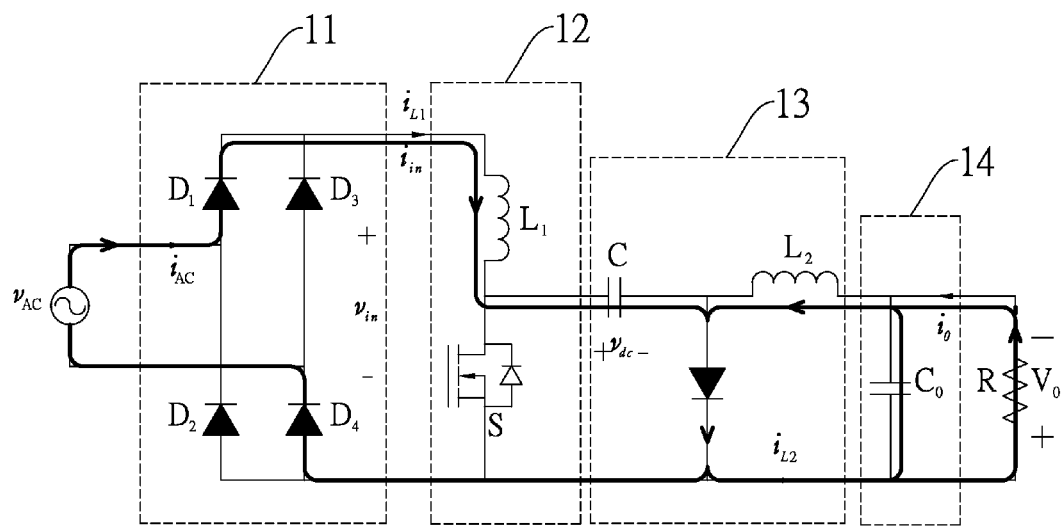
FIGS. 4 and 5 are the circuit schematic diagrams showing the operating mode 2 of the invention.
Figure 5:
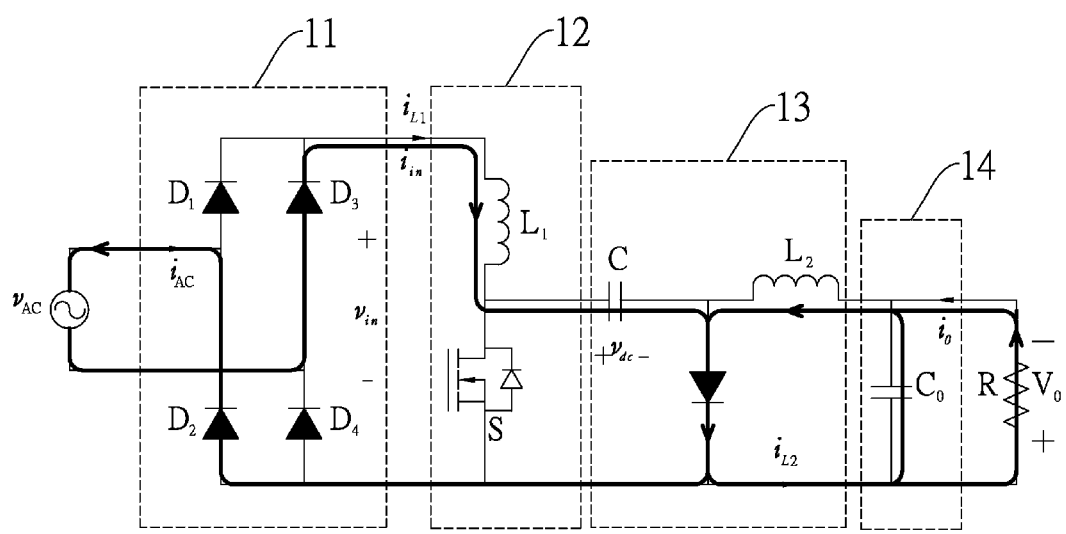

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A non-isolated AC/DC converter with power factor correction, comprising:
    an AC power supply;
    a rectifier circuit connected in parallel with the AC power supply, having a rectifier bridge configured by four first diodes, wherein the rectifier circuit converts the AC power supply into a positive half-sine wave power;
    a step-down circuit connected in parallel with the rectifier circuit, having a first inductor and an active switch, wherein the active switch is controlled by a waveform controller and presents conduction (ON) and cutoff (OFF), therefore as there is no transformer, a charging time of the positive half-sine wave power to the first inductor is controlled by using the conduction and the cutoff, thereby reducing the charging time and reducing potential, making the positive half-sine wave power step down;
    a filter/storage circuit connected in series with the step-down circuit, having a first capacitor, a second inductor and a second diode, wherein the first capacitor is able to filter the positive half-sine wave power after step-down, and make the positive half-sine wave power become a DC power, then the DC power is restored in the first capacitor and the second inductor; and
    a voltage regulator circuit connected in series with the filter/storage circuit and connected in parallel with a user end, having a second capacitor with one end directly connected to the second inductor and the other end directly connected to the second diode for regulation, allowing the active switch to be controlled by the waveform controller and presents a first operating mode that the active switch conducts, which allows AC power supply to be rectified by the rectifier circuit as the positive half-sine wave power, utilizing the first inductor to reduce the charging time, lowering voltage and storing energy in the first inductor, at the same time the first capacitor supplies power to the second inductor and the user end with its previously stored DC power, thus the second inductor proceeds with energy storage and the user end obtains the DC power, then, the active switch is controlled by the waveform controller and presents a second operating mode that the active switch is cut off, which allows the first inductor to pass its previously stored half-sine wave power through the first capacitor and to be rectified as the DC power and stored in the first capacitor, at the same time, the second inductor supplies power to the user end with its previously stored DC power; likewise, the first and the second operating modes are repeated constantly, and the user end promptly obtains DC power supply converted from the AC power supply, wherein the waveform controller adjusts and controls a conduction cycle d(t) of an output waveform of the active switch as following:

$$d(t) = \frac{V_o}{V_o + V_m|\sin \omega \tau|}$$

wherein, Vo is an output voltage, Vm is a maximum value of an input voltage, and sin ωτ is a sinusoidal frequency of a main voltage.

2. The non-isolated AC/DC converter with power factor correction of claim 1, wherein the waveform controller is a waveform generator which can output wave form to trigger and control the active switch presenting the conduction (ON) and the cutoff (OFF).

3. The non-isolated AC/DC converter with power factor correction of claim 1, wherein the user end is an LED bulb.

4. The non-isolated AC/DC converter with power factor correction of claim 1, wherein the AC power supply is provided by an electric power company.

* * * * *